United States Patent
Mizrahi et al.

(10) Patent No.: US 8,229,705 B1
(45) Date of Patent: Jul. 24, 2012

(54) PERFORMANCE MONITORING IN COMPUTER NETWORKS

(75) Inventors: Tal Mizrahi, Haifa (IL); David Melman, Hakerem (IL)

(73) Assignee: Marvell Israel (M.I.S.I.) Ltd., Yokneam (IL)

( * ) Notice: Subject to any disclaimer, the term of this patent is extended or adjusted under 35 U.S.C. 154(b) by 346 days.

(21) Appl. No.: 12/536,417

(22) Filed: Aug. 5, 2009

Related U.S. Application Data

(60) Provisional application No. 61/086,385, filed on Aug. 5, 2008.

(51) Int. Cl.
  *G06F 11/30* (2006.01)
(52) U.S. Cl. ........ 702/182; 702/179; 709/223; 709/203; 709/224; 709/227; 370/352; 370/236.2; 370/241.1
(58) Field of Classification Search .................. 702/182, 702/179; 709/223, 203, 224, 226, 227; 370/235, 370/241, 252, 352, 389, 419, 229, 241.2, 370/231, 232, 236.2, 241.1
See application file for complete search history.

(56) References Cited

U.S. PATENT DOCUMENTS

| | | | | |
|---|---|---|---|---|
| 6,058,102 | A * | 5/2000 | Drysdale et al. | 370/252 |
| 7,765,294 | B2 * | 7/2010 | Edwards et al. | 709/224 |
| 7,843,831 | B2 * | 11/2010 | Morrill et al. | 370/235 |
| 7,924,725 | B2 * | 4/2011 | Mohan et al. | 370/236.2 |
| 7,948,909 | B2 * | 5/2011 | Bugenhagen et al. | 370/252 |
| 7,983,189 | B2 * | 7/2011 | Bugenhagen | 370/253 |
| 8,000,318 | B2 * | 8/2011 | Wiley et al. | 370/352 |
| 8,015,294 | B2 * | 9/2011 | Bugenhagen et al. | 709/227 |
| 2003/0012152 | A1 * | 1/2003 | Feldman et al. | 370/316 |
| 2005/0099949 | A1 * | 5/2005 | Mohan et al. | 370/236.2 |
| 2005/0099951 | A1 * | 5/2005 | Mohan et al. | 370/241 |
| 2005/0099952 | A1 * | 5/2005 | Mohan et al. | 370/241 |
| 2005/0099954 | A1 * | 5/2005 | Mohan et al. | 370/241.1 |
| 2005/0099955 | A1 * | 5/2005 | Mohan et al. | 370/242 |
| 2006/0092847 | A1 * | 5/2006 | Mohan | 370/241.1 |
| 2006/0285501 | A1 * | 12/2006 | Damm | 370/252 |
| 2008/0049625 | A1 * | 2/2008 | Edwards et al. | 370/241 |
| 2008/0049637 | A1 * | 2/2008 | Morrill et al. | 370/252 |
| 2008/0049745 | A1 * | 2/2008 | Edwards et al. | 370/389 |
| 2008/0049775 | A1 * | 2/2008 | Morrill et al. | 370/419 |
| 2008/0279183 | A1 * | 11/2008 | Wiley et al. | 370/389 |
| 2009/0028091 | A1 * | 1/2009 | Dimou | 370/328 |
| 2011/0164502 | A1 * | 7/2011 | Mohan et al. | 370/236.2 |

OTHER PUBLICATIONS

IEEE P802.1AS/D0.8, "Draft Standard for Local and Metropolitan Area Networks—Timing and Synchronization for Time-Sensitive Applications in Bridged Local Area Networks," *The Institute of Electrical and Electronics Engineers, Inc.*, May 25, 2007.

IEEE P1588™ D2.2 "Draft Standard for a Precision Clock Synchronization Protocol for Networked Measurement and Control Systems," *The Institute of Electrical and Electronics Engineers, Inc.*, 2008.

(Continued)

*Primary Examiner* — Carol Tsai

(57) ABSTRACT

The present disclosure provides methods and apparatus for monitoring performance of a Maintenance Entity (ME) in a computer network. In one embodiment, a method of monitoring performance of an ME includes receiving a control frame via the ME. The method further includes using a hardware performance monitor to provide to a programmable processor a metric indicative of a performance parameter associated with the ME based at least in part on information in the control frame. The method further includes using the programmable processor to determine the performance parameter associated with the ME based at least in part on the metric provided using the hardware performance monitor.

25 Claims, 9 Drawing Sheets

OTHER PUBLICATIONS

ITU-T Y.1731 Series Y: Global Information Infrastructure, Internet Protocol Aspects and Next-Generation Networks Internet protocol aspects—Operation, administration and maintenance, *International Telecommunication Union*, Feb. 2008.

ITU-T Y.1731 Series Y: Global Information Infrastructure, Internet Protocol Aspects and Next-Generation Networks Internet protocol aspects—Operation, administration and maintenance, *International Telecommunication Union*, 82 pages, Feb. 2008.

* cited by examiner

US 8,229,705 B1

PERFORMANCE MONITORING IN COMPUTER NETWORKS

CROSS-REFERENCE TO RELATED APPLICATION

This application claims the benefit of U.S. Provisional Patent Application No. 61/086,385, entitled "Network Switches Supporting Loss Measurement," which was filed on Aug. 5, 2008, the entire disclosure of which is hereby incorporated by reference herein.

FIELD OF TECHNOLOGY

The present invention relates generally to communication networks and, more particularly, to performance monitoring in computer networks.

BACKGROUND

Communication networks, such as computer networks, typically include several interconnected devices that communicate with each other using data units (e.g., packets, frames and so on). Problems may arise in computer networks that may hinder transmission of a data unit from one device to another. For example, in some instances, data units may be delayed before arriving at their destination. Also, some data units may simply be lost entirely and may never arrive at their destination. It may often be necessary to monitor these and other performance parameters of computer networks.

SUMMARY

The present disclosure provides methods and apparatus for monitoring performance of a Maintenance Entity (ME) in a computer network.

In one embodiment a method of monitoring performance of an ME includes receiving a control frame via the ME. The method further includes using a hardware performance monitor to provide to a programmable processor a metric indicative of a performance parameter associated with the ME based at least in part on information in the control frame. The method further includes using the programmable processor to determine the performance parameter associated with the ME based at least in part on the metric provided using the hardware performance monitor.

In another embodiment, the method of monitoring performance of an ME includes using a programmable processor to generate a control frame for transmission via the ME. The method further includes providing the control frame to a hardware performance monitor. The method further includes using the hardware performance monitor to add a metric to the control frame, wherein the metric is indicative of a performance parameter associated with the ME. The method further includes transmitting the control frame.

In another embodiment, an apparatus includes a programmable processing unit and a forwarding engine coupled to the processing unit. The forwarding engine includes a hardware performance monitor configured to provide to the programmable processing unit a metric indicative of a performance parameter associated with a maintenance entity (ME) coupled to the forwarding engine, where the performance parameter is based at least in part on information in a control frame received by the forwarding engine from the ME. The programmable processing unit is configured to determine the performance parameter associated with the ME based at least in part on the metric provided using the hardware performance monitor.

BRIEF DESCRIPTION OF THE DRAWINGS

When individual elements are designated by references numbers in the form Nn, these elements may be referred to collectively by N. For example, FIG. 1 illustrates MEPs 105a-105d that may be referred to collectively as MEPs 105.

DETAILED DESCRIPTION

System Overview

Figure 1:
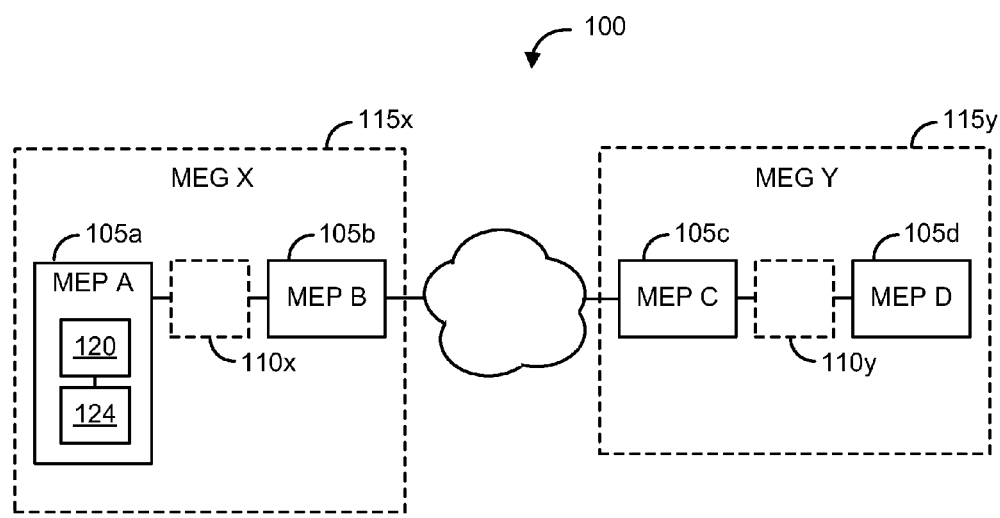
FIG. 1 is a block diagram of an example computer network 100 that includes performance measurement capabilities.

FIG. 1 is a block diagram of an example computer network 100 that includes performance measurement capabilities. The computer network 100 includes one or more Maintenance Entity Groups (MEGs) 115, each MEG corresponding to a physical or a logical (e.g., administrative) portion of the computer network 100, for example, such as a local area network (LAN), a virtual local area network (VLAN), and so on. A given MEG 115 may include two or more interconnected MEG End Points (MEPs) 105, e.g., switches, routers, etc., coupled via one or more Maintenance Entities (MEs) 110.

Although example MEGs 115 in the computer network 100 illustrated in FIG. 1 include two MEPs 105 coupled via a single ME 110, it is noted that a MEG 115 may include more than two MEPs 105 and/or be coupled via multiple MEs 110. Thus, both point-to-point and multipoint connections may be supported Generally, the terms ME, MEP, and MEG may have the same or similar meaning as defined by the Telecommunication Standardization Sector of the International Telecommunication Union (ITU-T) in the ITU-T Y.1731 Recommendation, which is hereby incorporated by reference herein in its entirety.

MEPs 105 may generally communicate (e.g., transmit and/or receive) data via MEs 110 using data frames, and a communication between two or more particular MEPs 105 may be referred to as an MEP-to-MEP session. An MEP-to-MEP session may be characterized and/or identified within a given MEP by a number of parameters, including the ME 110 associated with the MEP-to-MEP session, one or more peer MEPs associated with the MEP-to-MEP session, the VLAN (and/or the corresponding VLAN ID, of "VID") associated with the MEP-to-MEP session, a port, or a trunk, associated with the MEP-to-MEP session, a user priority (UP) associated with the session, etc., and/or any combination thereof.

Additionally, MEPs 105 may communicate control information using control frames in order to implement some control functions, such as Operation, Administration and Maintenance (OAM) functions (also known as Connectivity and Fault Management (CFM) functions), as defined in ITU-T Y.1731, for example. In particular, the MEPs 105 may communicate control information in order to implement OAM functions for performance monitoring, such as the OAM functions described in Section 8 of ITU-T Y.1731, including frame loss measurement and frame delay measurement. For example, a MEP 105 may determine one or more performance parameters associated with an ME 110 based on a control packet received from a peer MEP 105 via that ME 110. Additionally, or alternatively, a MEP 105 may send a control packet to a peer MEP 105 via an ME 110 to enable the peer MEP 105 to determine one or more performance parameters associated with that ME 110.

In order to generally increase accuracy and efficiency of performance measurement, at least one of the MEPs 105 (e.g., MEP 105a) includes a hardware performance monitor 120 and a programmable processor 124 (such as a central processing unit (CPU)) that work together to implement to implement OAM functions for performance monitoring. For example, for a MEP 105 to determine one or more performance parameters associated with an ME based on a control packet received from the peer MEP 105, the hardware performance monitor 120 generates and/or retrieves metrics indicative of the performance parameters associated with the ME 110. The hardware performance monitor 120 provides these metrics to the programmable processor 124, and the programmable processor 124 determines the performance parameters associated with the ME based on the metrics provided by the hardware performance monitor. Similarly, for a MEP 105 to enable a peer MEP 105 to determine one or more performance parameters associated with an ME 110, the MEP uses the programmable processor 124 to generate a control frame and provides that control frame to the hardware performance monitor 120. The hardware performance monitor 120 adds to the control frame one of more metrics indicative of the performance parameters associated with the ME, and the control frame is transmitted to the peer MEP 105.

Before discussing additional features of the MEP 105 that includes performance measurement capabilities, it is helpful to provide more details regarding OAM functions for performance monitoring that are described in Section 8 of ITU-T Y.1731. In particular, frame loss measurement and frame delay measurement, as specified in Section 8 of ITU-T Y.1731, will be discussed.

Overview of Frame Loss Measurement

In order to measure frame loss on a given ME, or multiple MEs between different MEPs (e.g., ME 110 between MEP A and MEP B), each MEP may maintain a count of transmitted and received data frames. Different MEPs may then, e.g., periodically, compare their frame counts to determine the number of frames that were lost via the ME.

In order to count the data frames that an MEP transmits toward and receives from its peer MEPs, the MEP may maintain two local counters for each peer MEP—one local counter for counting data frames transmitted toward each peer MEP ("TxFCl" in ITU-T Y.1731) and one local counter for counting data frames received from each peer MEP ("RxFCl" in ITU-T Y.1731). For example, in order to count the data frames that MEP A transmits toward and receives from its peer MEP B, MEP A may maintain a TxFCl counter and an RxFCl counter for its peer MEP B. Similarly, in order to count the data frames that MEP B transmits toward and receives from its peer MEP A, MEP B may maintain its own TxFCl and RxFCl counters for MEP A.

In order for the different MEPs (e.g., MEP A and MEP B) to then compare their frame counts, the MEPs may transmit, e.g., periodically, the values of their respective local TxFCl and RxFCl counters to each other using OAM frames (e.g., CCM frames, LMM frames, LMR frames, as defined in ITU-T Y.1731). Generally, by comparing the values of the counters in the received OAM frames with local counters TxFCl and RxFCl, MEP A and MEP B may measure frame loss associated with the ME 110. For example, if the RxFCl counter of the MEP B indicates that MEP B received 15 frames from MEP A via ME 110, and that the TxFCL counter of MEP A indicates that MEP A sent 20 frames to MEP B via ME 110, both MEP B and MEP A may infer that 5 frames were lost.

Frame loss measurement may be performed in a dual-ended fashion, where both MEP A and MEP B transmit OAM frames for measuring frame loss, and in a single-ended fashion, where one MEP transmits a request message to another MEP and performs frame loss measurements based on the received reply from the other MEP. Dual-ended and single-ended frame loss measurement will be subsequently described in more detail.

Dual-Ended Frame Loss Measurement

Figure 2A:
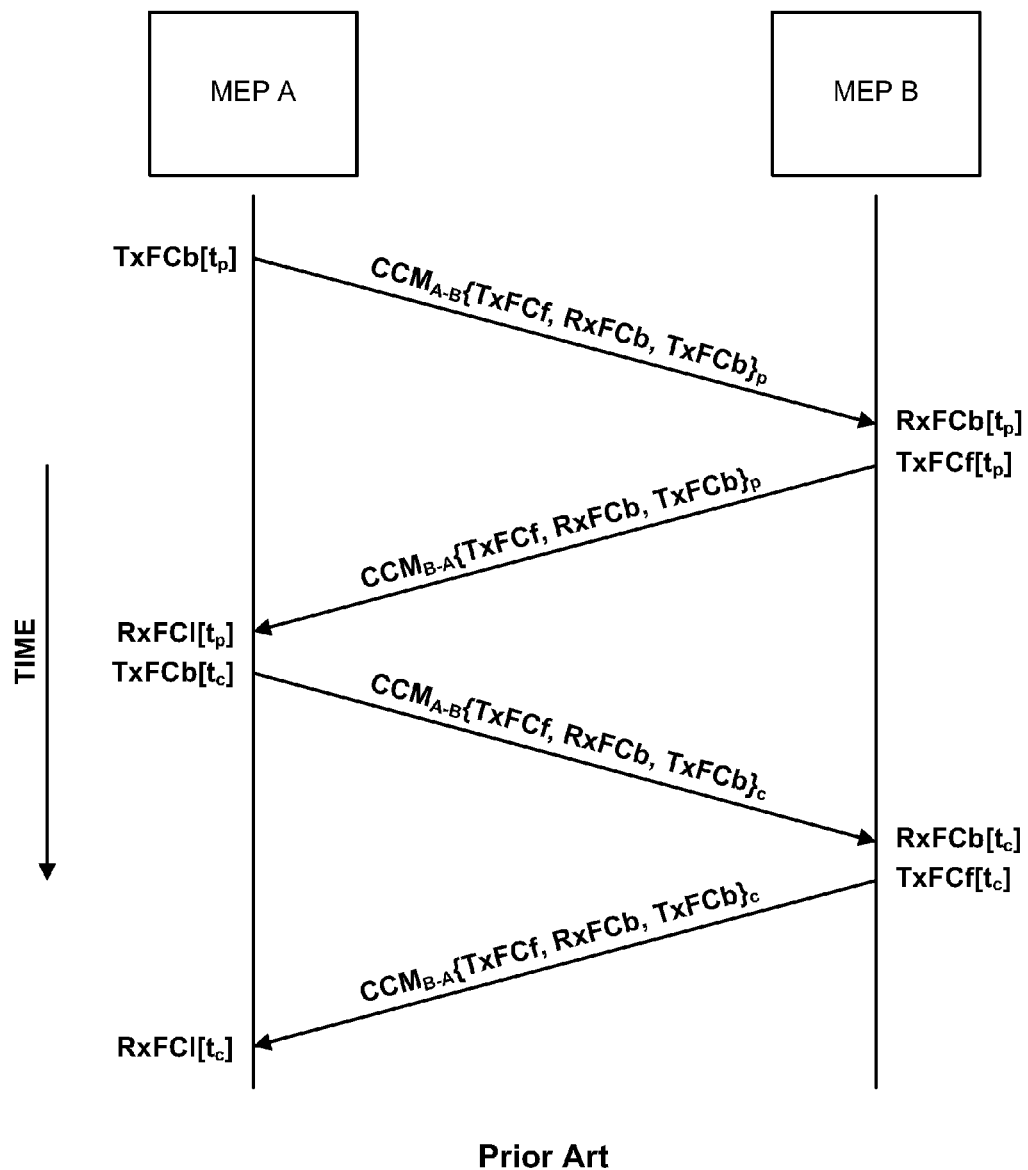
FIG. 2A is a message sequence diagram that illustrates an example of information exchange between two Maintenance Entity Group (MEG) End Points (MEPs) performing a dual-ended frame-loss measurement.

FIG. 2A is a message sequence diagram that illustrates an example of information exchange between two MEPs (MEP A and MEP B) performing a dual-ended frame loss measurement. Both MEP A and MEP B may transmit, e.g., periodically, Continuity Check Message (CCM) frames with information regarding their respective counters TxFCl and RxFCl at various points in time. In particular, MEP A and MEP B may transmit CCM frames that include the value of the local counter TxFCl at the time of transmission of the CCM frame ("TxFCf" in ITU-T Y.1731); the value of the local counter RxFCl at the time of reception of the last CCM frame from peer MEP ("RxFCb" in ITU-T Y.1731); and the value of TxFCf in the last received CCM frame from the peer MEP ("TxFCb" in ITU-T Y.1731).

Upon receiving a CCM frame via an ME at time $t_c$, an MEP may determine frame loss associated with the ME based on the values in the received CCM frame (at time $t_c$) and on value in the previously-received CCM frame (received at time $t_p$). That is, the MEP may determine frame loss associated with the ME based on TxFCf[$t_c$], RxFCb[$t_c$] and TxFCb[$t_c$] values and the local counter RxFCl[$t_c$] value at time $t_c$ and on TxFCf [$t_p$], RxFCb[$t_p$] and TxFCb[$t_p$] values and the local counter RxFCl[$t_p$] value at time $t_p$. In particular, an MEP may determine a near-end frame loss (i.e., frame loss associated with ingress data frames) and a far-end frame loss (i.e., frame loss associated with egress data frames) as follows:

Frame Loss$_{far-end}$ $TxFCb[t_c]-TxFCb[t_p]|-|RxFCb[t_c]-RxFCb[t_p]|$

Frame Loss$_{near-end}=|TxFCf[t_c]-TxFCf[t_p]|-|RxFCl[t_c]-RxFCl[t_p]|$

More details regarding dual-ended frame loss measurement may be found in ITU-T Y.1731, Section 8.1.1.

Single-Ended Frame Loss Measurement

Figure 2B:
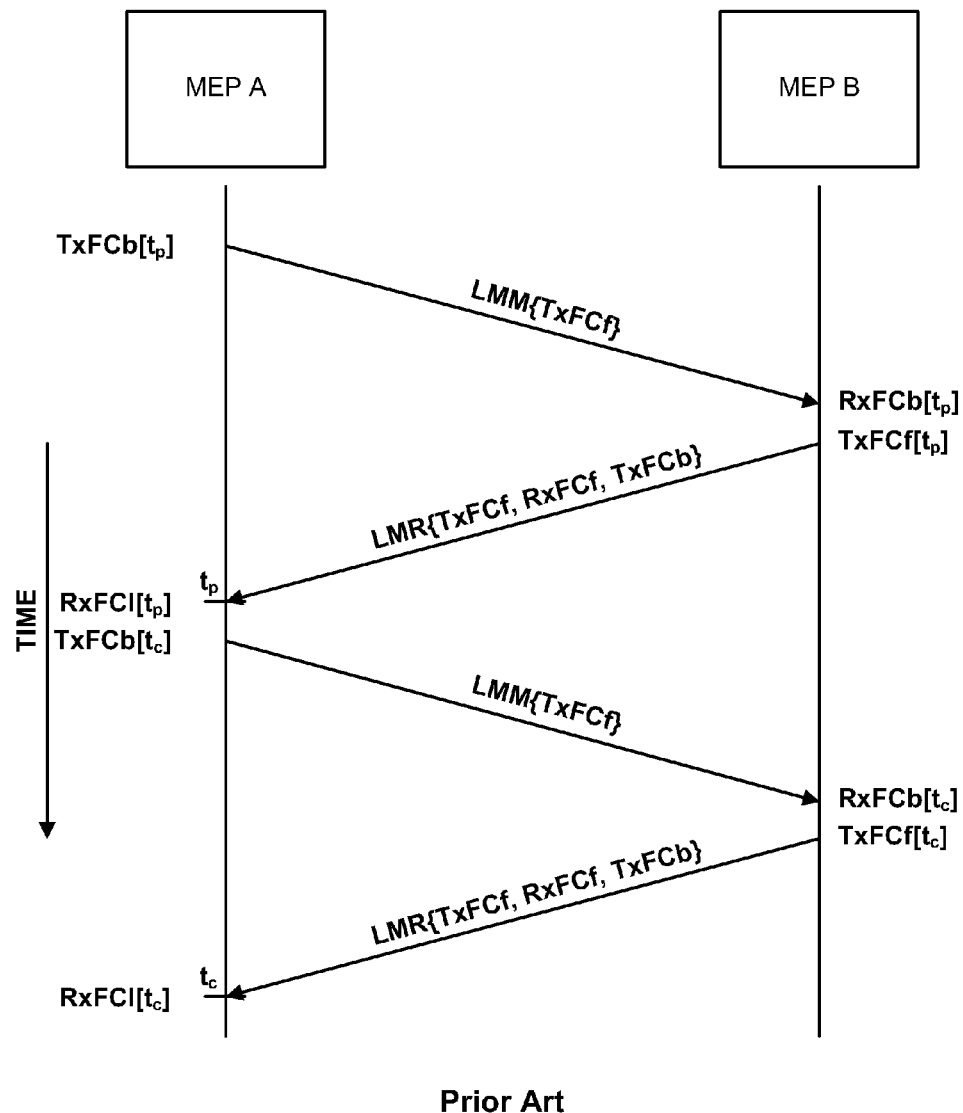
FIG. 2B is a message sequence diagram that illustrates an example of information exchange between two MEPs performing a single-ended frame-loss measurement.

FIG. 2B is a message sequence diagram that illustrates an example of information exchange between two MEPs (MEP A and MEP B) performing a single-ended frame-loss measurement. A single MEP (e.g., MEP A) may transmit a Loss Measurement Message (LMM) frame to its peer (e.g., MEP B) requesting information regarding the peer's counters. The LMM frame includes the value of the transmitting MEP's local counter TxFCl at the time of the LMM frame transmission ("TxFCf" in ITU-T Y.1731).

Upon receiving an LMM frame, the receiving MEP may generate a Loss Measurement Reply (LMR) frame in response. The LMR frame includes the value of TxFCf copied from the LMM frame ("TxFCf" in ITU-T Y.1731); the value of the local counter RxFCl at the time of reception of the LMM frame ("RxFCf" in ITU-T Y.1731); and the value of the local counter TxFCl at the time of transmission of the LMR frame ("TxFCb" in ITU-T Y.1731).

Upon receiving the LMR frame via an ME at time $t_c$, an MEP may measure frame loss associated with the ME based on the values in the received LMR frame (at time $t_c$) and on values in the previously-received LMR frame (received at time $t_p$). That is, the MEP may determine frame loss associated with the ME based on $TxFCf[t_c]$, $RxFCb[t_c]$ and $TxFCb[t_c]$ values and the local counter $RxFCl[t_c]$ value at time $t_c$ and on $TxFCf[t_p]$, $RxFCb[t_p]$ and $TxFCb[t_p]$ values and the local counter $RxFCl[t_p]$ value at time $t_p$. In particular, an MEP may determine a near-end frame loss and a far-end frame loss as follows:

$$\text{Frame Loss}_{far\text{-}end} = |TxFCb[t_c] - TxFCb[t_p]| - |RxFCb[t_c] - RxFCb[t_p]|$$

$$\text{Frame Loss}_{near\text{-}end} = |TxFCl[t_c] - TxFCf[t_p]| - |RxFCl[t_c] - RxFCl[t_p]|$$

More details regarding single-ended frame loss measurement may be found in ITU-T Y.1731, Section 8.1.2.

Overview of Frame Delay Measurement

In order to measure frame delay on a given ME, or multiple MEs between different MEPs (e.g., ME 110 between MEP A and MEP B), MEPs may generally timestamp outgoing and incoming frames. Based on the difference between the timestamps, MEPs may measure frame delays (e.g., one-way delay and two-way delay) associated with a given ME.

One-Way Frame Delay Measurement

Figure 3A:
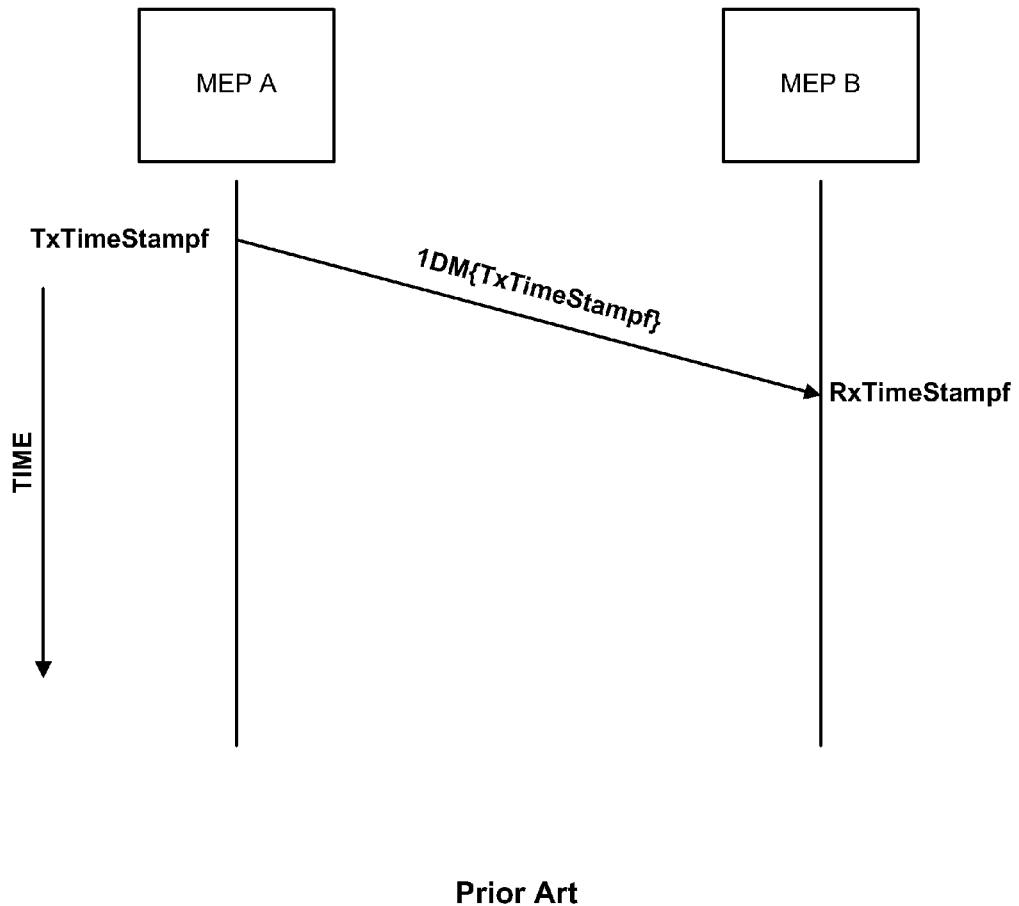
FIG. 3A is a message sequence diagram that illustrates an example of information exchange between two MEPs performing a one-way frame delay measurement.

FIG. 3A is a message sequence diagram that illustrates an example of information exchange between two MEPs (MEP A and MEP B) performing a one-way frame delay measurement. A transmitting MEP (e.g., MEP A) may transmit a One-way Delay Measurement (1DM) frame to another MEP (e.g., MEP B) specifying the time of the transmission of the 1DM frame ("TxTimeStampf" in ITU-T Y.1731). The receiving MEP B may compare TxTimeStampf with the time of the reception of the 1DM frame ("RxTimef" in ITU-T Y.1731), and calculate the one-way frame delay as TxTimeStampf-RxTimef, for example.

Two-Way Frame Delay Measurement

Figure 3B:
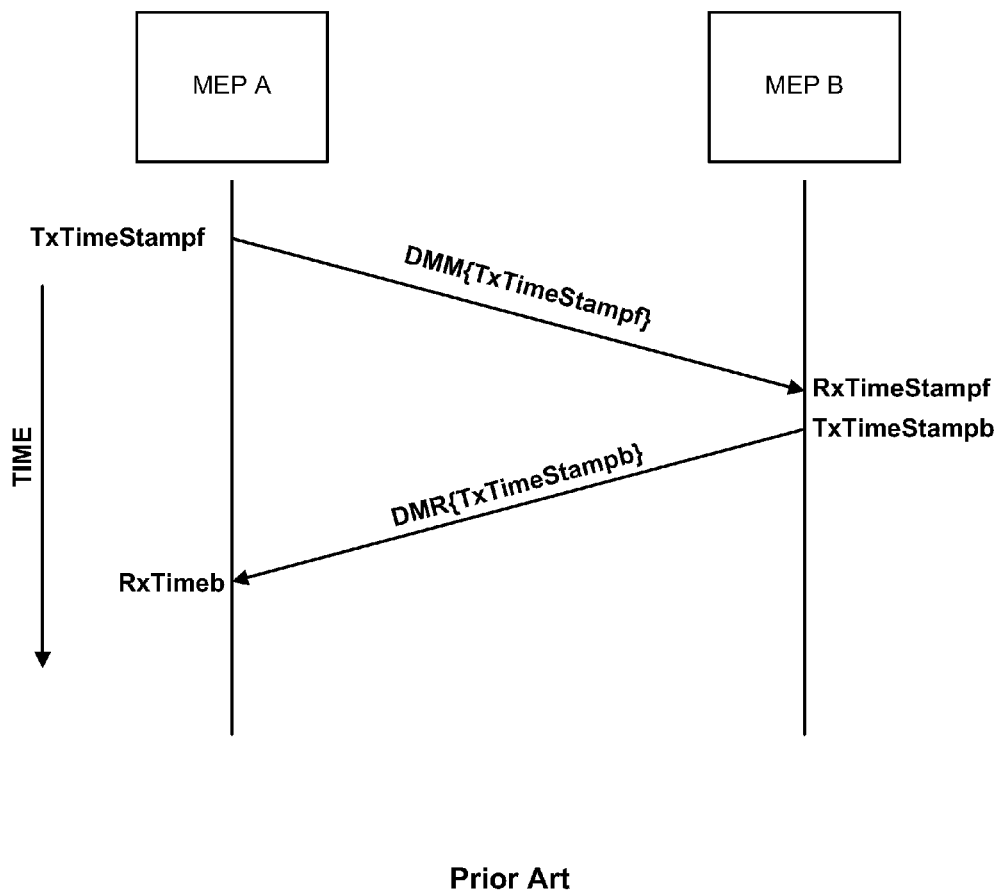
FIG. 3B is a message sequence diagram that illustrates an example of information exchange between two MEPs performing a two-way frame delay measurement.

FIG. 3B is a message sequence diagram that illustrates an example of information exchange between two MEPs (MEP A and MEP B) performing a two-way frame delay measurement. A transmitting MEP (e.g., MEP A) may transmit a Delay Measurement Message (DMM) frame to another MEP (e.g., MEP B) specifying the time TxTimeStampf of the transmission of the DMM frame. The receiving MEP B may respond with a Delay Measurement Reply (DMR) frame, specifying the time of the transmission of the DMR frame ("TxTimeStampb" in ITU-T Y.1731). MEP A may then use TxTimeStampf, TxTimeStampb, RxTimeb and the time of the reception of the DMR frame ("RxTimeb" in ITU-T Y.1731) to calculate the two-way delay as (RxTimeb-TxTimeStampf), or as (RxTimeb-TxTimeStampf)-(TxTimeStampb-RxTimeStampf), for example.

More details regarding frame delay measurement may be found in ITU-T Y.1731, Section 8.2.

Example Implementations of Performance Measurement

Figure 4:
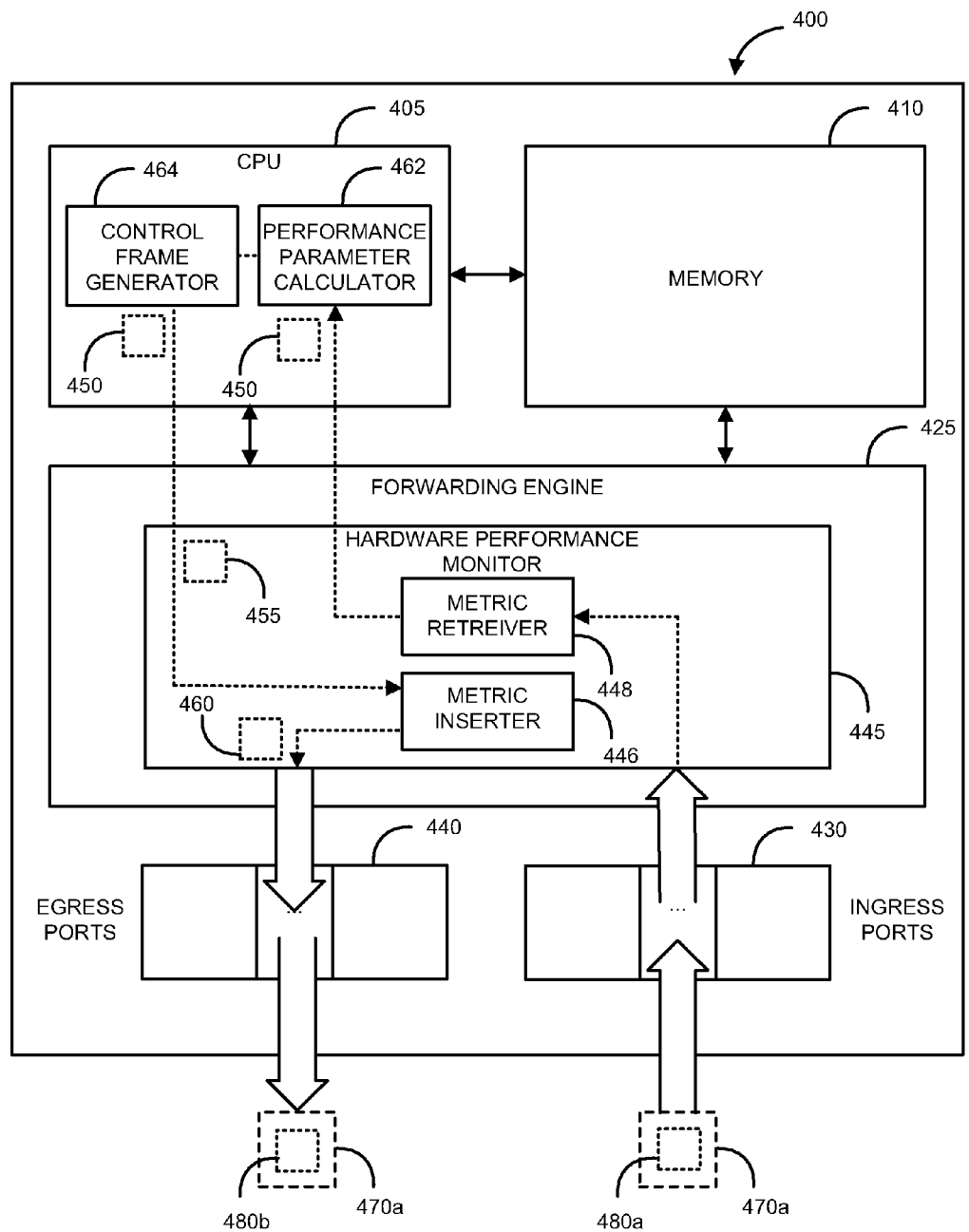
FIG. 4 is a block diagram of an example MEP that includes performance measurement capabilities.

FIG. 4 is a block diagram of an example MEP 400 that includes performance measurement capabilities. The MEP 400 may be utilized in the computer network 100 as one of the MEPs 105, for example. It will be understood, however, that the computer network 100 may alternatively use other MEPs 105.

The MEP 400 includes one or more ingress ports 430 and one or more egress ports 440. The ingress ports 430 are generally for receiving data units (e.g., frames) and control units 480a (e.g., OAM frames) via one or more MEs 470a, and the egress ports 440 are generally for transmitting data units and control units 480b via one or more MEs 470. The ingress ports 430 and the egress ports 440 are coupled together via a forwarding engine 425, which generally transfers data units from the ingress ports 430 to appropriate egress ports 440. The MEP 400 also includes a programmable processor, or a central processing unit (CPU) 405 coupled to the forwarding engine 425. The CPU 405 may execute computer readable instructions stored in a memory 410 coupled to the CPU 405.

The forwarding engine 425 generally performs wire speed functions, whereas the CPU 405 generally performs functions that can tolerate higher latency. The forwarding engine 425 may be implemented in hardware, e.g., on a single application specific integrated circuit (ASIC) coupled to the CPU 405. In other embodiments, other types of integrated circuits (ICs) may be used such as a field programmable gate array (FPGA), a programmable logic array (PLA), a custom integrated circuit, etc. In other embodiments, the forwarding engine 425 may be implemented on multiple different ICs that are coupled together. The memory 410 may be included on an IC on which at least a portion of the forwarding engine 425 is included, or alternatively, the memory 410 may be on an IC separate from the forwarding engine 425.

The forwarding engine 425 further includes a hardware performance monitor 445. The hardware performance monitor 445 includes a metric retriever 448 that generates and/or retrieves metrics 450 indicative of performance parameters associated with an ME 470a to which the MEP 400 is coupled. For example, the metric retriever 448 may generate a first time stamp when a control frame is received. Along with a second time stamp in the control frame, the first time stamp may indicate a frame delay associate with the control frame. The CPU 405 includes a performance parameter calculator 462 that determines the performance parameters. In particular, the hardware performance monitor 445 provides the metrics 450 to the CPU 405, and the CPU 405 may use the metrics to generate the performance parameters.

The CPU 405 may also include a control frame generator 464 to generate control frames 450 (e.g., in response to received control frames 480a). The CPU 405 may provide the generated control frames 450 to the hardware performance monitor 445, and the hardware performance monitor may use a metric inserter 446 to add to the generated control frames 450 metrics 460 that are indicative of a performance parameter associated with the ME 470b via which the generated control frame (with the metric 460) 480b will be transmitted.

Figure 5:
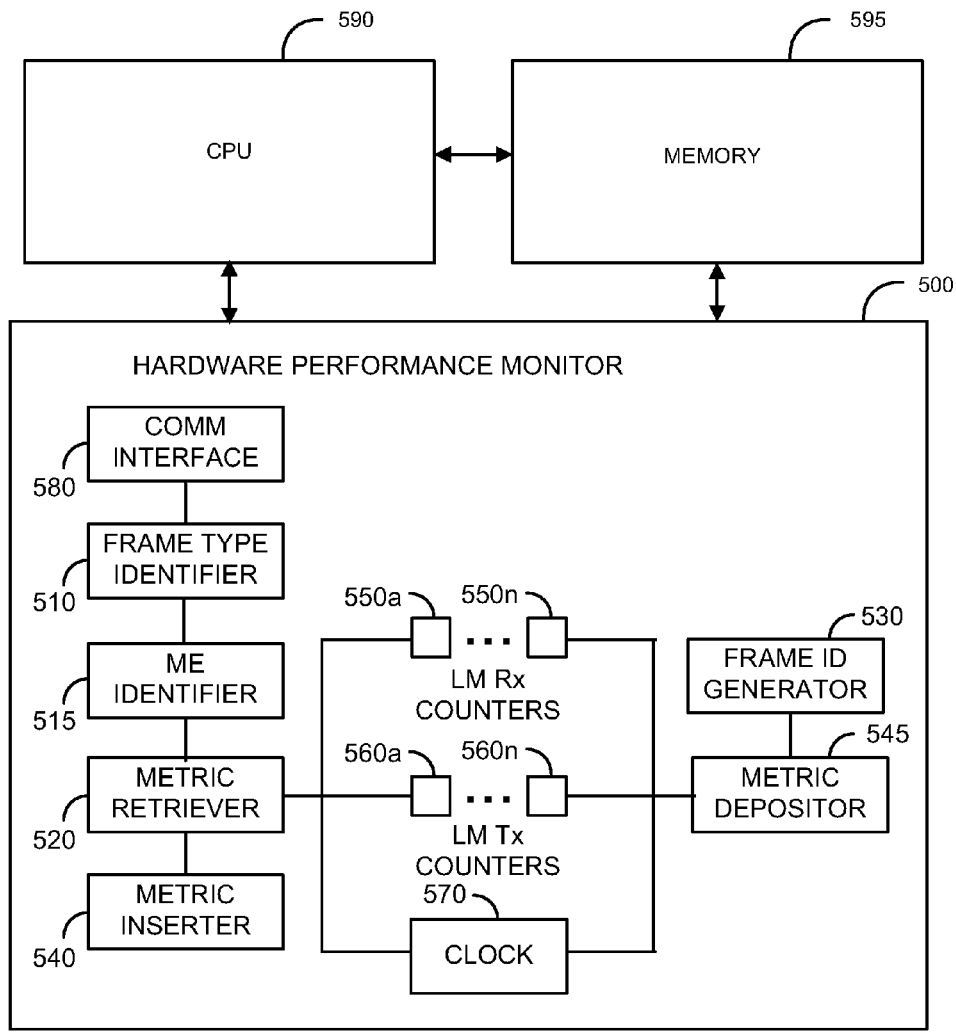
FIG. 5 is a block diagram of an example hardware performance monitor that may be used in the example MEP in FIG. 4.

FIG. 5 is a block diagram of an example hardware performance monitor 500. The hardware performance monitor 500 may be utilized in the forwarding engine 425 as the hardware performance monitor 445, for example. It will be understood, however, that the MEP 400 may alternatively use another suitable hardware performance monitor 445. Similarly, the hardware performance monitor 445 may be used in an MEP other than the MEP 400 of FIG. 4.

The hardware performance monitor 500 may generally be implemented in hardware and perform wire speed functions. For example, the performance monitor 500 may be implemented on a single application specific integrated circuit (ASIC). In other embodiments, other types of integrated circuits may be used such as a field programmable gate array (FPGA), a programmable logic array (PLA), a custom integrated circuit, etc.

The hardware performance monitor 500 may include a number of units that may be used for measuring performance parameters associated with MEs, or MEP-to-MEP sessions. For example, the hardware performance monitor 500 may include a frame type identifier 510 to identify different types of frames (e.g., data frames and different types of control frames). Additionally, the hardware performance monitor 500 may include an ME identifier 515 to identify the MEs, or MEP-to-MEP sessions that are associated with different frames.

In order to facilitate performance measurements, the hardware performance monitor 500 may further include a metric retriever 520 (e.g., similar to the metric retriever 448 discussed in reference to FIG. 4) that is configured to retrieve various metrics indicative of performance parameters associated with different MEs. For instance, the metric retriever 520 may include, or be coupled to one or more counters that count received data frames (further herein "LM Rx Counters" 550) and one or more counters that count transmitted data frames (further herein "LM Tx Counters" 560). In some embodiments, the metric retriever 520 may include, or be coupled to, one LM Tx Counter 560 and one LM Rx Counter 550 for each ME, or MEP-to-MEP session, that count data frames transmitted and received, respectively, via that MEP-to-MEP session. For instance, when a new data frame is received via a particular ME, or MEP-to-MEP session, the corresponding LM Rx Counter 550 may be incremented. Likewise, when a new data frame is transmitted via a particular ME, or MEP-to-MEP session, or when a new data frame is generally ready (e.g., queued) to be transmitted via the ME, or the MEP-to-MEP session, the corresponding LM Tx Counter 560 may be incremented.

As explained above, an ME, or an MEP-to-MEP session may be characterized and/or identified within a given MEP by a number of parameters. Accordingly, a given LM Rx Counter 550 and/or a given LM Tx Counter 560 associated with a particular ME, or MEP-to-MEP session, may also be associated with, or bound to, for example, a particular peer MEP associated with the MEP-to-MEP session, a particular VLAN (and the corresponding VID) associated with the MEP-to-MEP session, a particular port or a trunk associated with the MEP-to-MEP session, a particular user priority (UP) associated with the session, etc., or any combination thereof.

The metric retriever 520 may also include, or be coupled to a clock 570 (e.g., a real-time clock) that may be utilized for creating time stamps, e.g., in accordance with ITU-T Y.1731. For example, when a DMM frame, or a DRM frame is transmitted to a peer MEP, the clock may be used to timestamp these frames.

In addition to the metric retriever 520, the hardware performance monitor 500 may include a metric inserter 540 (e.g., similar to the metric inserter 446 described in reference to FIG. 4) for inserting the various metrics, e.g., retrieved by the metric retriever 520 into control frames. For instance, the metric inserter 540 may be utilized to insert values of various counters into CMM/LMM/LMR frames, time stamps into outgoing 1DM/DMM/DMR frames, or various metric into frames provided to other units of the MEP 400 (e.g., CPU 590).

As will be explained in reference to FIG. 6, instead of, or in addition to, inserting the metrics into control frames, the hardware performance monitor 500 may store the performance metrics in memory 595 using the metric depositor 545. In order to allow other units of the MEP 400 (e.g., CPU 595) to access the stored metrics, the hardware performance monitor 500 may associate metrics related to particular control frames with unique frame identifiers using a frame ID generator 530. The other units of the MEP 400 may then use the unique frame identifiers to access the access the metrics. Generation of unique frame identifiers will be discussed in more detail in reference to FIG. 6.

In order to communicate with other entities (e.g., the CPU, the egress and/or ingress ports), the hardware performance monitor 500 may also include a communication interface 580. A variety of different communication interfaces may be used including those known in the art.

Figure 6:
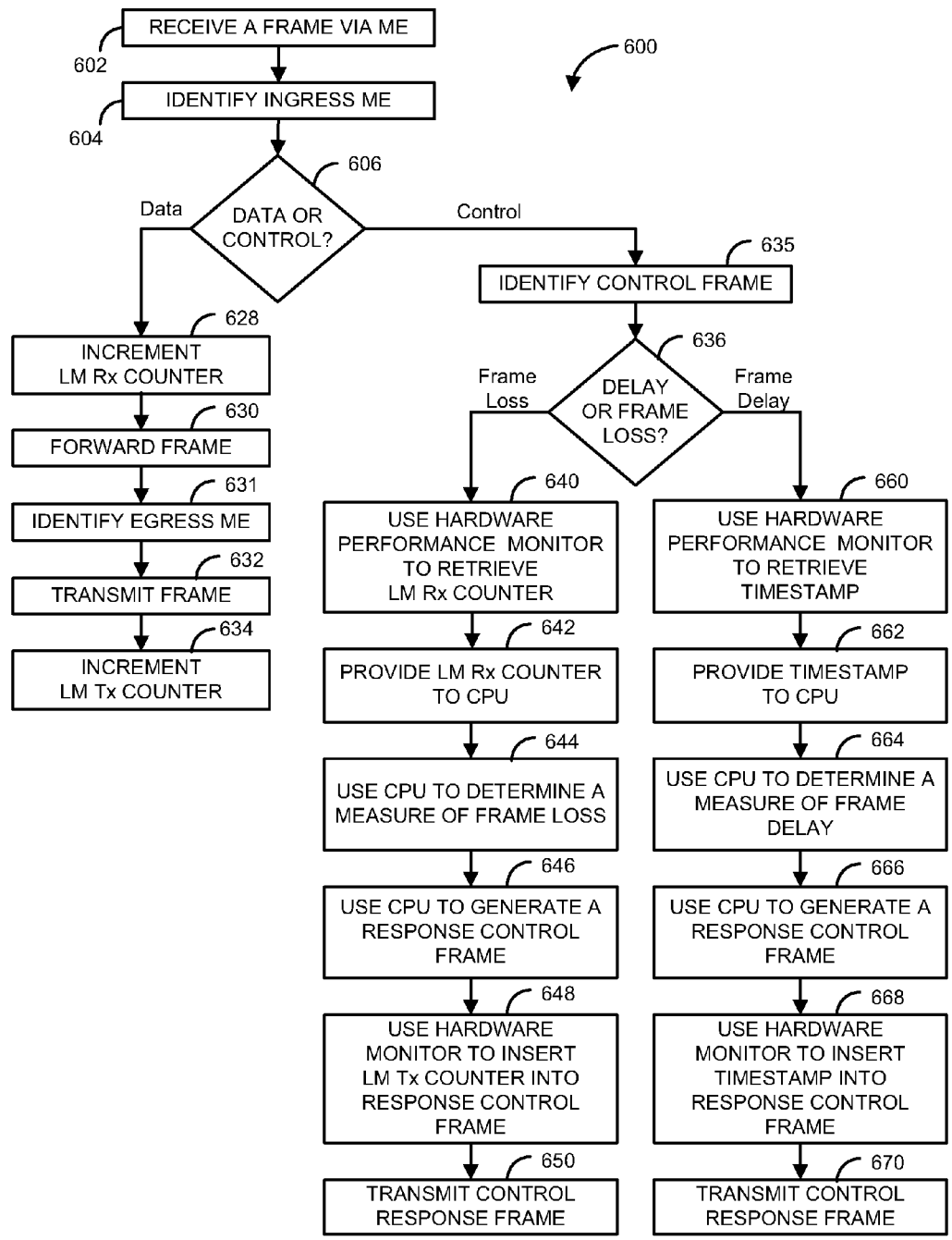
FIG. 6 is flow diagram illustrating an example method of measuring performance parameters of a computer network.

FIG. 6 is flow diagram illustrating an example method 600 of measuring performance parameters of a computer network (e.g., in accordance with ITU-T Y.1731) that may be implemented on a MEP, such as the MEP 400 illustrated in FIG. 4. For ease of explanation, FIG. 6 will be described with reference to FIGS. 1-5. It is noted, however, that the method 600 may be utilized with systems, devices or protocols other than those illustrated in FIGS. 1-5.

When an MEP 400 receives a frame via an ME, via one or more of its ingress ports 430 (block 602), the MEP 400 may first use its frame type identifier 510 to identify the type of the frame that was received (block 604). In particular, the MEP 400 may identify whether the received frame is a data frame or a control frame (block 606). If is determined at block 606 that the received frame is a data frame, for example, the MEP 400 may increment the LM Rx Counter 550 associated with the ME (block 628) and process the data frame, potentially using the forwarding engine to forwarding the data frame towards one or more egress ports 440 (block 630). The MEP 400 may then identify an egress ME (block 631) and transmit the data frame via the identified egress ME (block 632). The MEP may then increment the corresponding LM Tx Counter 560 (block 634).

If it is determined at block 606 that the received frame is a control frame, the MEP 400 may use its frame type identifier 510 to identify the type of the control frame (block 635). For example, the MEP 400 may identify whether the received control frame is of a type related to frame loss measurement, e.g., a CMM, LMM, or an LMR frame, or that the control frame is related to frame delay measurement, e.g., a 1DM, DMM, or a DMR frame (block 636). In order to determine the type of the control frame, the frame type identifier 510 may parse the header of the received control frame to identify relevant attributes of the control frame, such as the OpCode of the control frame. If the OpCode of the frame is equal to 47, for instance, the frame type identifier 510 may determine that the control frame is a DMM frame. More information about the different OpCodes and, more generally, the format of different control frames, may be found in Section 9 of ITU-T Y.1731.

While the MEP 400 may process the control frame differently depending on whether the control frame is related to frame loss measurement or to frame delay measurement, there may be substantial commonality in the way control frames related to frame loss measurement and control frames related to frame delay measurement are processed by the MEP 400, as will be subsequently explained. As a result, if the hardware performance monitory 445 is implemented in hardware, at least some of the same hardware logic may be used to facilitate the measurement of frame loss and frame delay. This may lead to a more optimum use of hardware and software resources because some such resources may be shared.

Regardless of whether the control frame is related to frame loss measurement or to frame delay measurement, the MEP 400 may use the hardware performance monitor 445 to provide to the CPU 405 a metric indicative of a performance parameter associated with the ME via which the control frame was received. If it is determined at block 636 that the control frame is related to frame loss (e.g., a CMM, LMM, or an LMR frame), the MEP 400 may use the metric retriever 520 to retrieve the value of the LM Rx Counter 550 associate with the ME via which the control frame was received (block 640) and then provide that value to the CPU (block 642). Likewise, if it is determined at block 636 that the control frame is related to frame delay (e.g., a 1DM, DMM, or a DMR frame), the MEP 400 may use the metric retriever 520 and/or the clock 570, for instance, to retrieve a timestamp with the time at which the control frame was received (block 660) and then provide that value to the CPU (block 662).

The metric associated with the control frame (e.g., a value of a counter or a timestamp) may be provided to the CPU in a variety of ways. For example, in some embodiments, the metric may simply be inserted into the control frame by the metric inserter 540, and the control frame may be passed to the CPU 405 (e.g., trapped to the CPU 405), e.g., via one or more communication interfaces 580. In other embodiments, the metric may be stored at a location in memory (e.g., the memory 425), and the location in memory may be associated with the control frame via a unique frame identifier. Once the control frame is received at the CPU 405, the CPU 405 may use the unique frame identifier to determine the location of the metric in the memory and retrieve the metric from the memory.

The unique frame identifier may be determined, or generated, in a variety of ways. In some embodiments, the unique frame identifier may be determined, or generated, based on the content of the received control frame. If the received control frame is related to frame loss measurement, for instance, the values of RxFCl, TxFCb, RxFCf, TxFCf, or combinations thereof may be used to determine the unique frame identifier. For instance, the unique frame identifier may be a sum, or a hash function (e.g., a cyclic redundancy check (CRC) function) of two or more of these values. Similarly, if the received control frame is related to frame delay measurement, the values of RxTimeb, TxTimeStampf, TxTimeStampfb, RxTimeStampf, or combinations thereof may be used to determine the unique frame identifier. As one example, the unique frame identifier may be a sum or a hash function (e.g., a CRC hash function) of two or more of these values. Because RxTimeb, TxTimeStampf, TxTimeStampfb, RxTimeStampf, RxFCl, TxFCb, RxFCf and TxFCf monotonically increase as new frames are transmitted and/or received, the likelihood of the same unique frame identifier being generated for two different control frames is relatively low.

In some embodiments, the unique frame identifier may be determined independently of the content of the received control frame. For example, the MEP 400 may maintain a separate counter for the purpose of generating unique frame identifiers. As new frames are received and/or transmitted, the separate counter may be incremented, and the unique frame identifiers may be generated based on the value in the separate counter. Because the counter is incremented as new frames are transmitted and or/received, the likelihood of the same unique frame identifier being generated for two different control frames is relatively low.

Once the metric indicative of a performance parameter associated with the ME via which the control frame was received is provided to the CPU 405, the CPU may use that metric and, optionally, other information in the control frame, to determine the corresponding performance parameters, or measures related thereto. For example, the CPU 405 may use the value of the LM Rx Counter 550 to determine a measure of frame loss (block 644), e.g., in accordance with the techniques described above and in Section 8.1 of ITU-T Y.1731. Similarly, CPU 405 may use timestamp values to determine a measure of frame delay (block 664), e.g., in accordance with the techniques described above and in Section 8.2 of ITU-T Y.1731.

The CPU 405 may further be used to generate a response control frame and provide the response control frame to the hardware performance monitor 445 (blocks 646 and 666). For example, if the received control frame is a CMM frame or an LMM frame, the CPU 405 may generate a response CMM frame, or a response LMR frame, respectively. Likewise, if the received control frame is a DMM frame, the CPU 405 may generate a response DMR frame.

The metric inserter 540 may be used to insert metrics into the response control frame before the response control frame is transmitted to a peer MEP, or peer MEPs, via respective MEs. The metric, or metrics, inserted into response control frames are indicative of a performance parameter associated with the ME, and a respective peer MEP coupled to the same ME may use the metric to perform its own performance measurements to determine performance parameters, such as frame loss and frame delay associated with the ME. For example, if the response control frame is related to frame loss measurement, before transmitting the response control frame via an ME to a peer MEP (block 650), the hardware performance monitor 445 may insert the value of the LM Tx Counter 560 into the response control frame for use by peer MEPs (block 648). Likewise, if the response control frame is related to frame delay measurement, before transmitting the response control frame via an ME to a peer MEP (block 670), the hardware performance monitor 445 may insert a timestamp into the response control frame (block 668). The value of the LM Tx Counter 560 and the timestamp value may be values of the respective metrics at the time, or shortly before, the transmission of the response control frame.

It is noted that receiving a control frame is not a necessary precondition for the CPU 405 to generate a control frame. For example, in order to enable a peer MEP to determine one of more performance parameters associated with the respective ME, the CPU 405 may be used to generate a new control frame and provide the generated control frame to the hardware performance monitor 445 (block 646 or blocks 668). The hardware performance monitor 445 may be used to add to the generated control frame a metric that is indicative of a performance parameter (block 648 or 668), and the generated control frame may be transmitted (block 650 or block 670).

The hardware performance monitor 500 illustrated in FIG. 5 and referred to in reference to FIG. 6 has been described as a single block. However, it is noted that the various units 510-580 within the hardware performance monitor 500 may be combined or divided into a variety of different physical, logical and functional blocks. Furthermore, in some embodiments, or in some modes of operation, the hardware performance monitor 500 may not include one or more of the units 510-580 or, alternatively, may not use each of the modules 510-580 in performing performance measurement functions. Still further, the hardware performance monitor 500 may include additional units that, for ease of explanation of the teaching principles of this disclosure, are not shown in FIG. 5.

Figure 7:
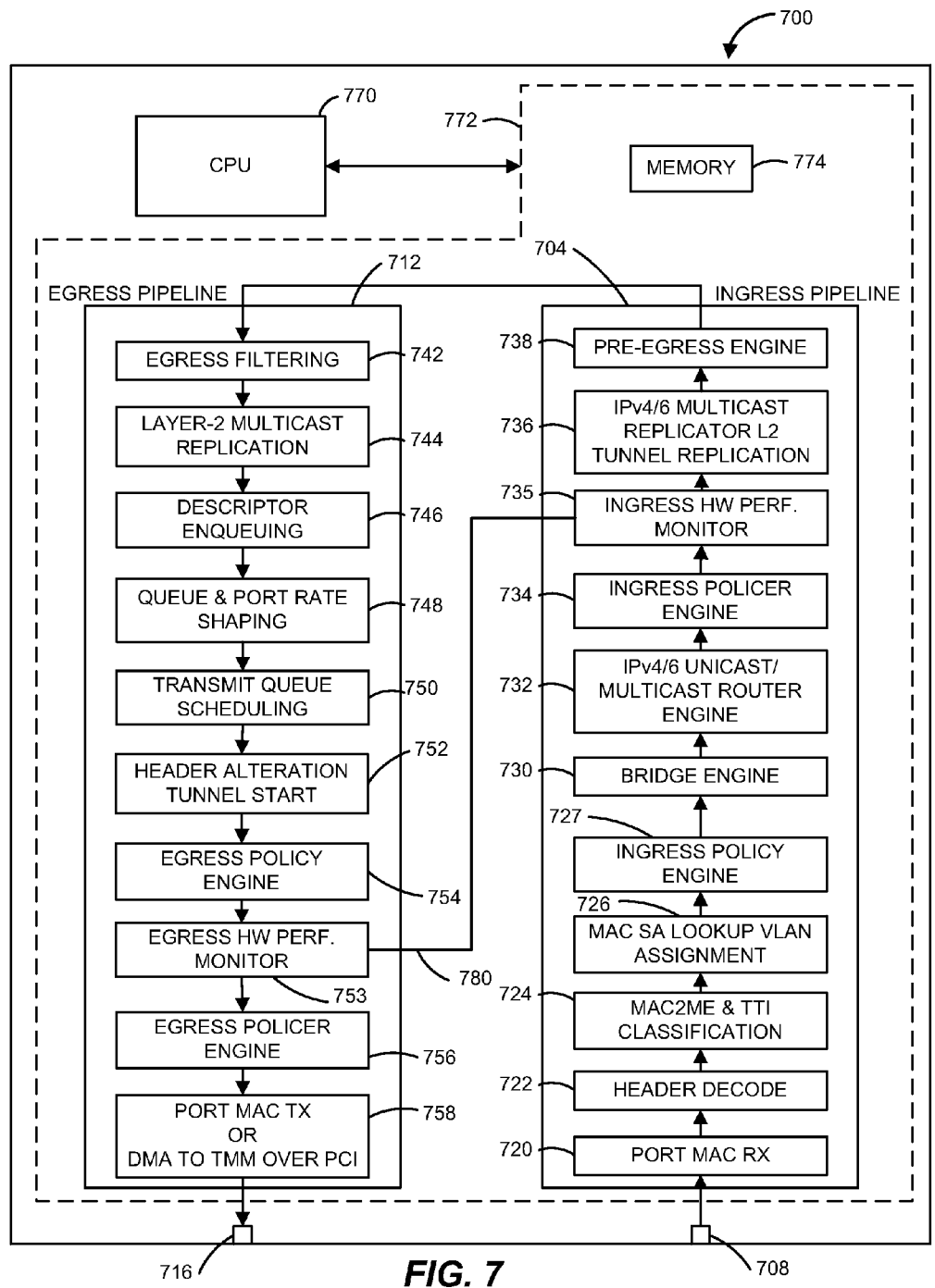
FIG. 7 is a block diagram of another example MEP that includes performance measurement capabilities.

FIG. 7 is a block diagram of an example MEP 700 that includes performance measurement capabilities and may generally support performance measurement functions, such as those described in ITU-T Y.1731. The MEP 700 may be utilized in the computer network 100 as one of the MEPs 105, for example. It will be understood, however, that the computer network 100 may alternatively use other MEPs 105.

Generally, the MEP 700 includes a programmable processor 770 coupled to an ingress pipeline 704 and an egress pipeline 712. The programmable processor 770 may be implemented by a central processing unit (CPU) configured according to computer readable instructions stored on a memory 774 coupled to the CPU. The ingress pipeline 704 and the egress pipeline 712 may be implemented on an application specific integrated circuit (ASIC) 772 coupled to the CPU 770. In other embodiments, other types of integrated circuits may be used such as a field programmable gate array (FPGA), a programmable logic array (PLA), a custom integrated circuit, etc. In other embodiments, the ingress pipeline 704 and the egress pipeline 712 or various modules in the pipelines 704, 712 may be implemented on multiple different integrated circuits that are coupled together. Generally, the ASIC 772 operates at wire speed whereas the CPU 770 may operate at a much slower speed.

In some embodiments, the performance measurement capabilities of the MEP 700 may be distributed among various units of the MEP 700, including an ingress hardware performance monitor 735 for processing received frames and an egress hardware performance monitor 753 for processing frames to be transmitted. The ingress hardware performance monitor 735 and the egress hardware performance monitor 753 may be coupled together via a connection 780. In other embodiments, the ingress hardware performance monitor 735 and the egress hardware performance monitor 753 may be combined into a single unit or be further divided into more units. Together, the ingress hardware performance monitor 735 and the egress hardware performance monitor 753 may include some or all of the functionality of the hardware performance monitor 500 described in reference to FIGS. 5-6.

The ingress pipeline 704 may be coupled to one or more input circuits 708 and the egress pipeline 712 may be coupled to one or more output circuits 716. Additionally, the ingress pipeline 704 and the egress pipeline 712 are coupled together. The input circuits 708 and the output circuits 716 may be coupled to one or more networks such as a wide area network (WAN), a local area network (LAN), such a wired LAN or a wireless LAN (WLAN), etc. The one or more input circuits 708 are generally for receiving frames and the one or more output circuits are generally for transmitting frame. The ingress pipeline 704 and the egress pipeline 712 generally transfer frames from the input circuits 708 to appropriate ones of the output circuits 716. The one or more input circuits 708 may correspond to one or more input ports of the MEP 700, and the one or more output circuits 716 may correspond to one or more output ports of the MEP 700.

As seen in FIG. 7, the ingress pipeline 704 and the egress pipeline 712 each include a plurality of units coupled in series. Generally, each unit of a pipeline optionally processes a frame (or packet) or a frame descriptor corresponding to the frame and then passes the frame or the frame descriptor to the next unit in the pipeline. A frame descriptor may include some information from the frame, such as some or all of the header information of the frame. The frame descriptor may include other information as well such as an indicator of where the frame is stored in a memory associated with the MEP 700. For ease of explanation, the term "frame" hereinafter may be used to refer to a frame itself or to a frame descriptor associated with the frame. Each unit may or may not process a particular frame. For example, in some instances, a unit may simply forward a frame onto the next unit in the pipeline. The last unit of the ingress pipeline 704 passes the frame to the first unit of the egress pipeline 712.

Each or at least some of the units of the ingress pipeline 704 and the egress pipeline 712 may include, or otherwise be associated with, a corresponding memory. A frame received by a unit may be stored in the memory associated with the unit.

The ingress pipeline 704 includes a port media access control (MAC) receiver unit 720 coupled to the input circuits 708. The port MAC receiver unit 720 generally implements media access control functions. A header decode unit 722 is coupled to the port MAC receiver unit 720 and generally decodes the header of each frame received via the input circuits 708. This may include parsing or identifying different segments of the header for use by subsequent units in the ingress pipeline 704 and, optionally, units in the egress pipeline 712.

A MAC2ME & TTI classification unit 724 is coupled to the header decode unit 722. The MAC2ME & TTI classification unit 724 generally performs two lookup functions. In a first lookup function (a MAC2ME lookup), frames that are destined to a MAC address, VLAN pair associated with the MEP 700 may be identified. This identification may be used in one or more subsequent functions or pipeline units. A second lookup function (a tunnel termination interface (TTI) lookup) may be used for tunnel termination identification and/or classifying a logical interface according to L2 or L3 header fields. In an embodiment, the MAC2ME & TTI classification unit 724 may include, or be coupled to, a ternary content addressable memory (TCAM) or other suitable memory. In this embodiment, the TTI lookup may include using fields of the header of the frame being processed and other information (such as the result of the MAC2ME lookup) as a key to the TCAM. Optionally, the TTI lookup may utilize one or more additional memory components such as a static random access memory (SRAM). For example, an entry in the TCAM may point to a particular location in an SRAM, and the TTI lookup may include retrieving information from the SRAM. The TTI lookup may indicate that the frame should be associated with one or more TTI actions, such as assigning a VLAN identifier (VID), quality of service (QoS) parameters, etc., to the frame. A MAC source address (SA) lookup virtual LAN (VLAN) assignment unit 726 is coupled to the MAC2ME and TTI classification unit 724. The MAC SA lookup VLAN assignment unit 726 generally uses the MAC source address in a frame header, and possibly other information, to determine to which VLAN, if any, a particular frame belongs.

The ingress policy engine 727 is coupled to the MAC SA lookup VLAN assignment unit 726. Generally, the ingress policy engine 727 engine may be a flexible TCAM-based lookup that is able to identify flows based on various criteria, and to apply various policy actions on each flow. Such policy actions may include, for example, making a forwarding decision, assign quality of service (QoS) attributes, assigning VLAN ID, etc.

A bridge engine 730 is coupled to the ingress policy engine 727. The bridge engine 730 includes, or is coupled to, a forwarding database (not shown) that includes MAC destination addresses and indications of their corresponding network segments. The bridge engine 730 generally handles the forwarding of frames destined for a segment of a network to which the MEP 700 is connected. The bridge engine determines whether a received frame should be forwarded to a different network segment and, if so, to which network segment the frame should be forwarded. Determination of whether, and to where a frame should be forwarded, may be done by examining the MAC destination address of the frame and determining to which network segment the destination address corresponds using the forwarding database. Also, other information may be utilized as well, such as VLAN information. The bridge engine 730 also may maintain the forwarding database.

A router engine 732 is coupled to the bridge engine 730. If a received frame is not destined for a network to which the MEP 700 is connected, then routing based on an Internet Protocol (IP) address may be performed. The router engine 732 includes, or is coupled to, a routing information database (not shown) that includes information corresponding to where IP frames should be forwarded. The router engine 732 generally determines to where a received IP frame should be routed. This may be done by examining the IP destination address of the frame and routing information stored in the routing information database. The router engine 732 also maintains the routing information database. In an embodiment, the router engine 732 may be compliant with IP version 4 (v4) and IP version 6 (v6). Of course, in other embodiments, the router engine 732 additionally or alternatively may be compliant with one or more other IP versions including previous IP versions and IP versions not yet standardized. Additionally, the router engine 732 may be capable of determining destinations for multicast frames.

An ingress policer engine 734 may be coupled to the router engine 732. The ingress policer engine 734 may be considered an observation point as defined in RFC 3917. The ingress policer engine 734 generally performs rate limiting and makes flow traffic measurements and stores flow measurement information in flow entries. The ingress policer engine 734 may include a plurality of counters for making flow traffic measurements. The ingress policer engine 734 also may sample frames. Additionally, the ingress policer engine 734 also may apply time stamps to frames or to descriptors associated with the frames. The ingress policer engine 734 may take different actions for different flows. Thus, the ingress policer engine 734 may utilize flow classification information (e.g., a flow identifier for a frame) from the ingress policy engine 727 in determining what actions should be taken.

An ingress hardware performance monitor 735 may be coupled to the ingress policer engine 734 and may be configured to processes received frames to identify metrics associated with performance parameters of the MEs via which the frames arrive. In particular, the ingress hardware performance monitor 735 provides to the programmable processor (or CPU) 770 metrics indicative of performance parameters (e.g., frame loss, frame delay) associated with those MEs. The CPU 770 may use these metrics to determine the corresponding performance parameters of the MEs. In some embodiments, the ingress hardware performance monitor 735 processes received frames as described above in reference to FIGS. 1-6.

A multicast replicator 736 may be coupled to the ingress hardware performance monitor 735. The multicast replicator 736 generally replicates multicast frames, if necessary, for forwarding via multiple output circuits 716. The multicast replicator 736 may be compliant with IP v4 and IP v6, for example. Additionally, the multicast replicator 736 may support a multicast extension to the Layer Two Tunneling Protocol (LTTP).

A pre-egress engine 738 may be coupled to the multicast replicator 736. The pre-egress engine 738 generally analyzes decisions made by previous units in the ingress pipeline 704 and drops, forwards or duplicates the frame or frame descriptor to the egress pipeline 712 based on the analysis. If the frame destination is a trunk, the pre-egress engine 738 may select the trunk member to which the frame is transmitted, based on a configurable has function for example.

The egress pipeline 712 may be coupled to the pre-egress engine 738. In particular, an egress filtering unit 742 may be coupled to the pre-egress engine 738. A Layer-2 multicast replication unit 744 is coupled to the egress filtering unit 742. A descriptor enqueuing unit 746 is coupled to the Layer-2 multicast replication unit 744. The descriptor enqueuing unit 746 generally enqueues frame descriptors in a plurality of queues corresponding to different classes of flows, for example.

A queue and port rate shaping unit 748 is coupled to the descriptor enqueuing unit 746. A transmit queue scheduling unit 750 is coupled to the queue and port rate shaping unit 748. The transmit queue scheduling unit 750 generally enqueues frame descriptors from the queues associated with the descriptor enqueuing unit 746 into one or more transmit queues corresponding to the one or more output circuits 716. A header alteration, tunnel start unit 752 is coupled to the transmit queue scheduling unit 750. The header alteration, tunnel start unit 752 generally alters the header of a frame as needed. For example, a source address, a destination address, etc. may be altered for a next hop, a tunnel header may be prepended if the frame is to be forwarded to a tunnel start interface, etc.

An egress policy engine 754 is coupled to the header alteration, tunnel start unit 752. The egress policy engine 754 may be considered an observation point as defined in RFC 3917. The egress policy engine 754 generally determines whether an egressing frame belongs to an existing flow (i.e., a flow of which the MEP 700 is already aware) or belongs to a currently unknown flow (sometimes referred to in the present disclosure as a "new flow"). If the egressing frame belongs to an existing flow, the egress policy engine 754 will determine the existing flow to which the egressing frame belongs. Additionally, the egress policy engine 754 detects whether an egressing frame belongs to a new flow. The egress policy engine 754 may attach a flow identifier to the egressing frame. If an egressing frame is part of an existing flow, the flow identifier may indicate the flow to which the egressing frame belongs. If the egressing frame is not part of an existing flow, the flow identifier may indicate that the egressing frame belongs to a new flow.

An egress hardware performance monitor 753 may be coupled to the egress policy engine 754 and may be configured to processes outgoing frames before they are transmitted to peer MEPs to implement certain process management functions. In particular, the egress policy engine 754 may insert metrics into outgoing frames that are indicative of a performance parameter associated with the associated MEs. The respective peer MEPs may use these metrics to perform their own performance measurements to determine performance parameters, such as frame loss and frame delay associated with the ME. In some embodiments, the egress hardware performance monitor 755 processes received frames as described above in reference to FIGS. 1-6.

An egress policer engine 756 may be coupled to the egress hardware performance monitor 755. The egress policer engine 756 may be considered an observation point as defined in RFC 3917. The egress policer engine 756 generally performs rate limiting and makes flow traffic measurements and stores flow measurement information in flow entries. The egress policer engine 756 may include a plurality of counters for making flow traffic measurements. The egress policer engine 756 also may sample frames. Additionally, the egress policer engine 756 also may apply time stamps to frames or to descriptors associated with the frames. The ingress policer engine 734 may take different actions for different flows. Thus, the egress policer engine 756 may utilize flow classification information (e.g., a flow identifier for a frame) from the ingress policy engine 727 or the egress policy engine 754 in determining what actions should be taken.

A port MAC transmit or direct memory access (DMA) to traffic monitoring manager (TMM) unit 758 is coupled to the egress policer engine 756. The port MAC transmit/DMA to TMM unit 758 generally implements media access control functions and forwards frames to the output circuits 716.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of monitoring performance of a Maintenance Entity (ME) in a computer network, the method comprising:
   receiving a control frame via the ME;
   using a hardware performance monitor to provide to a programmable processor a metric indicative of a performance parameter associated with the ME based at least in part on information in the control frame, including:
      storing the metric at a location in memory,
      determining a frame identifier for the control frame,
      associating the location in memory with the frame identifier, and
      providing the frame identifier to the programmable processor; and
   using the programmable processor to determine the performance parameter associated with the ME based at least in part on the metric provided using the hardware performance monitor.

2. The method of claim 1, further comprising:
   using the hardware performance monitor to maintain a count of a number of data frames received via the ME, wherein the metric indicative of the performance parameter associated with the ME is the count of the data frames received via the ME at a time when the control frame is received, and wherein the performance parameter is a measure of frame loss associated with the ME.

3. The method of claim 1, further comprising using the hardware performance monitor to determine a time at which the control frame is received, wherein the metric indicative of the performance parameter associated with the ME is the time at which the control frame is received, and wherein the performance parameter is a measure of frame delay associated with the ME.

4. The method of claim 1, wherein determining the frame identifier is based on a number of control frames received via the ME at a time of determining the frame identifier.

5. The method of claim 1, wherein determining the frame identifier is based on at least some information in the control frame.

6. The method of claim 1, wherein the metric indicative of the performance parameter associated with the ME is a first metric indicative of the performance parameter associated with the ME, the method further comprising:
   using the programmable processor to generate a response control frame for transmission via the ME;
   providing the response control frame to the hardware performance monitor;
   using the hardware performance monitor to add a second metric to the response control frame, wherein the second metric is indicative of a performance parameter associated with the ME; and
   transmitting the control frame via the ME.

7. The method of claim 6, further comprising maintaining a count of a number of data frames transmitted via the ME, wherein the second metric indicative of the performance parameter associated with the ME is the count of the data frames transmitted via the ME at a time when the response control frame is transmitted, and wherein the performance parameter is a measure of frame loss associated with the ME.

8. The method of claim 6, further comprising determining a time at which the response control frame is transmitted, wherein the second metric indicative of the performance parameter associated with the ME is the time at which the response control frame is transmitted, and wherein the performance parameter is a measure of frame delay associated with the ME.

9. The method of claim 1, wherein the hardware performance monitor is implemented using an integrated circuit.

10. A method of monitoring performance of a Maintenance Entity (ME), the method comprising:
    receiving a control frame via the ME;
    using a hardware performance monitor to provide to a programmable processor a first metric indicative of a performance parameter associated with the ME based at least in part on information in the control frame;
    using the programmable processor to determine the performance parameter associated with the ME based at least in part on the first metric provided using the hardware performance monitor;
    using the programmable processor to generate a response control frame for transmission via the ME;
    providing the response control frame to the hardware performance monitor;
    using the hardware performance monitor to add a second metric to the response control frame, wherein the metric is indicative of the performance parameter associated with the ME; and
    transmitting the response control frame.

11. The method of claim 10, further comprising maintaining a count of a number of data frames transmitted via the ME, wherein the second metric indicative of the performance parameter associated with the ME is the count of the data frames transmitted via the ME at a time when the response control frame is transmitted.

12. The method of claim 10, further comprising determining a time at which the response control frame is transmitted, wherein the second metric indicative of the performance parameter associated with the ME is the time at which the response control frame is transmitted, and wherein the performance parameter is a measure of frame delay associated with the ME.

13. An apparatus, comprising:
a programmable processing unit;
a forwarding engine coupled to the processing unit, wherein the forwarding engine includes a hardware performance monitor configured to:
provide to the programmable processing unit a first metric indicative of a performance parameter associated with a maintenance entity (ME) coupled to the forwarding engine, wherein the performance parameter is based at least in part on information in a control frame received by the forwarding engine from the ME;
wherein the programmable processing unit is configured to:
determine the performance parameter associated with the ME based at least in part on the first metric provided using the hardware performance monitor,
generate a response control frame for transmission via the ME, and
provide the response control frame to the hardware performance monitor;
wherein the hardware performance monitor is further configured to add a second metric to the response control frame, wherein the second metric is indicative of the performance parameter associated with the ME; and
wherein the forwarding engine is configured to transmit the control frame via the ME.

14. The apparatus of claim 13, wherein the hardware performance monitor includes a counter to maintain a count of a number of data frames received via the ME, wherein the first metric indicative of the performance parameter associated with the ME is the count of the data frames received via the ME at a time when the control frame is received, and wherein the performance parameter is a measure of frame loss associated with the ME.

15. The apparatus of claim 13, wherein the hardware performance monitor includes a timer to determine a time at which the control frame is received, wherein the first metric indicative of the performance parameter associated with the ME is the time at which the control frame is received, and wherein the performance parameter is a measure of frame delay associated with the ME.

16. The apparatus of claim 13, wherein the hardware performance monitor is configured to add the metric to the control frame and to provide the control frame to the programmable processor.

17. The apparatus of claim 13, wherein the hardware performance monitor is configured to store the metric at a location in a memory of the apparatus and indicate the location to the programmable processor.

18. The method of claim 10, wherein using the hardware performance monitor to provide to the programmable processor the first metric indicative of the performance parameter associated with the ME comprises using the hardware performance monitor to add the first metric to the control frame and to provide the control frame to the programmable processor.

19. The method of claim 10, wherein using the hardware performance monitor to provide to the programmable processor the first metric indicative of the performance parameter associated with the ME comprises:
storing the first metric at a location in a memory; and
indicating the location to the programmable processor.

20. The apparatus of claim 13, wherein the hardware performance monitor includes a counter to maintain a count of a number of data frames transmitted via the ME, wherein the second metric indicative of the performance parameter associated with the ME is the count of the data frames transmitted via the ME at a time when the response control frame is transmitted, and wherein the performance parameter is a measure of frame loss associated with the ME.

21. The apparatus of claim 13, wherein the hardware performance monitor includes a timer to determine a time at which the response control frame is transmitted, wherein the second metric indicative of the performance parameter associated with the ME is the time at which the response control frame is transmitted, and wherein the performance parameter is a measure of frame delay associated with the ME.

22. An apparatus, comprising:
a programmable processing unit;
a forwarding engine coupled to the processing unit, wherein the forwarding engine includes a hardware performance monitor configured to:
provide to the programmable processing unit a metric indicative of a performance parameter associated with a maintenance entity (ME) coupled to the forwarding engine, including:
storing the metric at a location in a memory,
determining a frame identifier for the control frame,
associating the location in the memory with the unique frame identifier, and
providing the unique frame identifier to the programmable processor,
wherein the performance parameter is based at least in part on information in a control frame received by the forwarding engine from the ME;
wherein the programmable processing unit is configured to determine the performance parameter associated with the ME based at least in part on the metric provided using the hardware performance monitor.

23. The apparatus of claim 22, wherein the hardware performance monitor includes a counter to maintain a count of a number of data frames received via the ME, wherein the metric indicative of the performance parameter associated with the ME is the count of the data frames received via the ME at a time when the control frame is received, and wherein the performance parameter is a measure of frame loss associated with the ME.

24. The apparatus of claim 22, wherein the hardware performance monitor includes a timer to determine a time at which the control frame is received, wherein the metric indicative of the performance parameter associated with the ME is the time at which the control frame is received, and wherein the performance parameter is a measure of frame delay associated with the ME.

25. The apparatus of claim 22, wherein the metric is a first metric, and wherein the programmable processing unit is configured to:
generate a response control frame for transmission via the ME, and
provide the response control frame to the hardware performance monitor;
wherein the hardware performance monitor is further configured to add a second metric to the response control frame, wherein the second metric is indicative of the performance parameter associated with the ME; and
wherein the forwarding engine is configured to transmit the control frame via the ME.

* * * * *

UNITED STATES PATENT AND TRADEMARK OFFICE
CERTIFICATE OF CORRECTION

PATENT NO.       : 8,229,705 B1  
APPLICATION NO.  : 12/536417  
DATED            : July 24, 2012  
INVENTOR(S)      : Tal Mizrahi et al.

It is certified that error appears in the above-identified patent and that said Letters Patent is hereby corrected as shown below:

Title Page Item (73): The correct assignee is Marvell Israel (M.I.S.L) Ltd. (Yokneam, IL).

Signed and Sealed this  
Third Day of September, 2013

Teresa Stanek Rea  
*Acting Director of the United States Patent and Trademark Office*